(12) United States Patent
Tanaka et al.

(10) Patent No.: US 7,789,557 B2
(45) Date of Patent: Sep. 7, 2010

(54) SUPERCONDUCTING RADIOMETRY APPARATUS

(75) Inventors: Keiichi Tanaka, Chiba (JP); Akikazu Odawara, Chiba (JP); Satoshi Nakayama, Chiba (JP)

(73) Assignee: SII NanoTechnology Inc. (JP)

( * ) Notice: Subject to any disclaimer, the term of this patent is extended or adjusted under 35 U.S.C. 154(b) by 649 days.

(21) Appl. No.: 11/810,767

(22) Filed: Jun. 7, 2007

(65) Prior Publication Data

US 2010/0019152 A1 Jan. 28, 2010

(30) Foreign Application Priority Data

Jul. 5, 2006 (JP) ............... 2006-185850

(51) Int. Cl.
*G01K 7/00* (2006.01)
*G01K 17/00* (2006.01)
*H01L 39/00* (2006.01)

(52) U.S. Cl. ............... 374/176; 374/31; 250/336.2

(58) Field of Classification Search ........... 374/176, 374/31; 250/336.2
See application file for complete search history.

(56) References Cited

U.S. PATENT DOCUMENTS

| 5,880,468 | A | * | 3/1999 | Irwin et al. | ............ 250/336.2 |
|---|---|---|---|---|---|
| 6,211,519 | B1 | * | 4/2001 | Nam et al. | ............ 250/336.2 |
| 2004/0011960 | A1 | * | 1/2004 | Morooka et al. | ......... 250/336.1 |
| 2004/0030505 | A1 | * | 2/2004 | Tanaka et al. | ................. 702/31 |
| 2005/0184238 | A1 | * | 8/2005 | Odawara et al. | ......... 250/336.2 |
| 2006/0058196 | A1 | * | 3/2006 | Yefremenko et al. | ........ 505/190 |
| 2007/0291902 | A1 | * | 12/2007 | Tanaka et al. | ............... 378/162 |
| 2009/0278046 | A1 | * | 11/2009 | Allen et al. | ............. 250/336.1 |

* cited by examiner

*Primary Examiner*—Gail Verbitsky
*Assistant Examiner*—Mirellys Jagan
(74) *Attorney, Agent, or Firm*—Adams & Wilks (57) ABSTRACT

A superconducting radiometry apparatus has a micro-calorie meter that detects an energy of a radiant ray as a temperature change. A signal detection mechanism detects an electric current flowing to the micro-calorie meter. A heat addition device adds a quantity of heat to the micro-calorie meter. A peak value monitor measures, in synchronization with the addition of the quantity of heat to the micro-calorie meter, a peak value of an output voltage corresponding to an output signal from the signal detection mechanism. An energy correction device corrects, on the basis of an output from the peak value monitor, an energy value so as to become a peak value corresponding to the quantity of heat added to the micro-calorie meter.

20 Claims, 10 Drawing Sheets

PRIOR ART

FIG.7

PRIOR ART

FIG.8

PRIOR ART

FIG. 9

PRIOR ART

FIG.10

PRIOR ART

SUPERCONDUCTING RADIOMETRY APPARATUS

BACKGROUND OF THE INVENTION

1. Field of the Invention

The present invention relates to a superconducting radiometry apparatus for performing an element analysis or an impurity inspection.

2. Description of the Related Art

In a radiometry apparatus used in element analysis, impurity inspection or the like, there is noted a superconducting radiation detection apparatus utilizing a superconductor detector capable of improving by at least one figure, an energy resolving power of a conventional radiometry apparatus which uses a semiconductor detector.

Since the energy resolving power of the radiometry apparatus using the semiconductor detector depends on an energy gap width that a semiconductor has, it is impossible to become below 130 eV. On the other hand, among the superconducting radiation detection apparatuses using the superconductor detector, there is especially expected a micro-calorie meter capable of making the energy resolving power into 10 eV or less.

The micro-calorie meter is constituted by an absorber absorbing an X-ray, a thermometer whose resistance value changes under a constant voltage by a heat generated by the absorber, and a membrane for controlling a heat flow rate by which a heat generated by the absorber and the thermometer escapes to a heat tub.

If a radiant ray such as an X-ray emitted from a sample enters into the absorber, a Joule heat is generated in the thermometer by that radiant ray, and heat escapes to the heat tub while transmitting through the membrane. By adjusting a balance between the Joule heat and the escaping heat, the thermometer comprising a material becoming the superconductor at a temperature below a liquid nitrogen temperature (absolute temperature 77 K) is retained at an operation point in a region called a superconducting transformation end that is a transition state between a superconducting state and a normal conducting state. As a result, a large resistance change occurs in the thermometer in regard to a minute temperature change, and the micro-calorie meter, by utilizing this, detects and analyzes the radiant ray.

The micro-calorie meter utilizing this superconducting transformation end of the superconductor is called a TES (Transition Edge Sensor).

Figure 6:
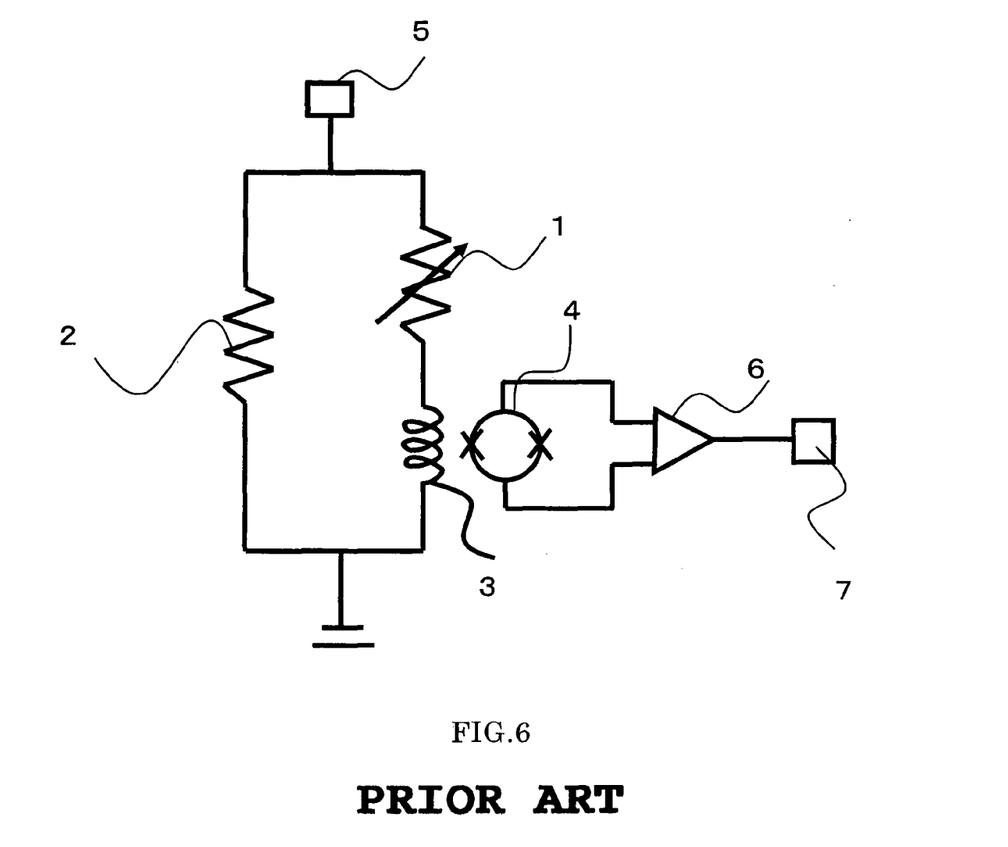
FIG. 6 is a schematic constitution diagram showing a conventional superconducting radiometry apparatus.

FIG. 6 is a schematic constitution diagram of a conventional superconducting radiometry apparatus using the micro-calorie meter.

A micro-calorie meter 1 and an input coil 3 are connected, and to it there is connected in parallel a shunt resistance 2 having a resistance value sufficiently smaller than the micro-calorie meter 1, and a constant voltage is applied by a bias electric source 5.

An electric current flowing to the micro-calorie meter 1 is detected as an electric field signal by an SQUID amplifier 4, in which a superconducting quantum interference device (SQUID: Superconducting QUantum Interference Device) operating at the temperature below the liquid nitrogen temperature (absolute temperature 77 K) is plurally connected in series, and thereafter it is converted into an electric signal and amplified. And, an output signal from the SQUID amplifier 4 is sent to a room temperature amplifier 6, shaped and amplified. An output voltage from the room temperature amplifier 6 is selected while corresponding to a peak value by a wave height analyzer 7 for every energy to thereby be accumulated, and a result is spectrum-displayed by a display device (not shown in the drawing) or the like.

Here, if an X-ray which is one of the radiant rays consisting of, e.g., a corpuscular beam, an electromagnetic wave or the like is irradiated to the micro-calorie meter 1, a temperature of the thermometer minutely rises by the X-ray entering to the absorber of the micro-calorie meter 1. By it, a resistance value of the thermometer of the micro-calorie meter 1 increases. And, since the thermometer is retained at the constant voltage, the electric current flowing to the micro-calorie meter 1 decreases.

Here, since the electric current decreases, it acts in a direction in which the temperature of the thermometer lowers, and a negative feedback occurs so as to return it to a constant temperature. This is called a self electron-thermal feedback (ETF: Electron-Thermal Feedback). By optimizing the voltage of the bias electric source and a temperature of the heat tub, the thermometer of the micro-calorie meter is kept to the superconducting transformation end.

Furthermore, a displacement of the electric current flowing to the micro-calorie meter 1 is detected by the room temperature amplifier 6 through the SQUID amplifier or the like.

A peak value of an output signal from the room temperature amplifier 6 has a relation monotonously increasing in regard to an energy value of the entered X-ray. An energy of the X-ray which entered to the micro-calorie meter 1 can be found by previously finding a correlation diagram between a peak value of the output voltage from the room temperature amplifier 6 and an energy of the X-ray, and measuring a peak value of the generated output voltage.

Here, a relation between the energy (E) of the X-ray which entered to the micro-calorie meter 1 and a displacement quantity ($\Delta I$) of the electric current is denoted by an expression 1. Here, Vn is an operating voltage, and $\tau$eff a time constant of an electric current pulse.

$$E=\Delta I V_n \tau_{\mathit{eff}} \qquad \text{Expression 1}$$

By measuring this displacement quantity of the electric current, it is possible to find the energy of the entered X-ray (e.g., refer to K. D. Irwin, "An application of electrothermal feedback for high resolution cryogenic particle detection", Applied Physics Letters, Volume 66, 1998-2000 (1995)).

However, in the superconducting radiometry apparatus like this, in a case where the energy of the entering X-ray is constant, although the peak value of the output signal from the room temperature amplifier becomes constant, there is such an issue that the peak value of the output signal from the room temperature amplifier changes by the fact that there occurs a thermal radiation following upon a temperature change of a thermal shield plate for thermally protecting the micro-calorie meter from an outside, or a resistance change of the micro-calorie meter, which follows upon a change in an external magnetic field exerted on the micro-calorie meter, so that a shift of the detected X-ray energy occurs.

Whereupon, in a case where the peak value of the output signal from the room temperature amplifier in regard to the X-ray of a fixed energy changes with a time, in order to obtain a high energy resolving power, it is necessary to perform an energy calibration so as not to change in regard to the time.

Figure 7:
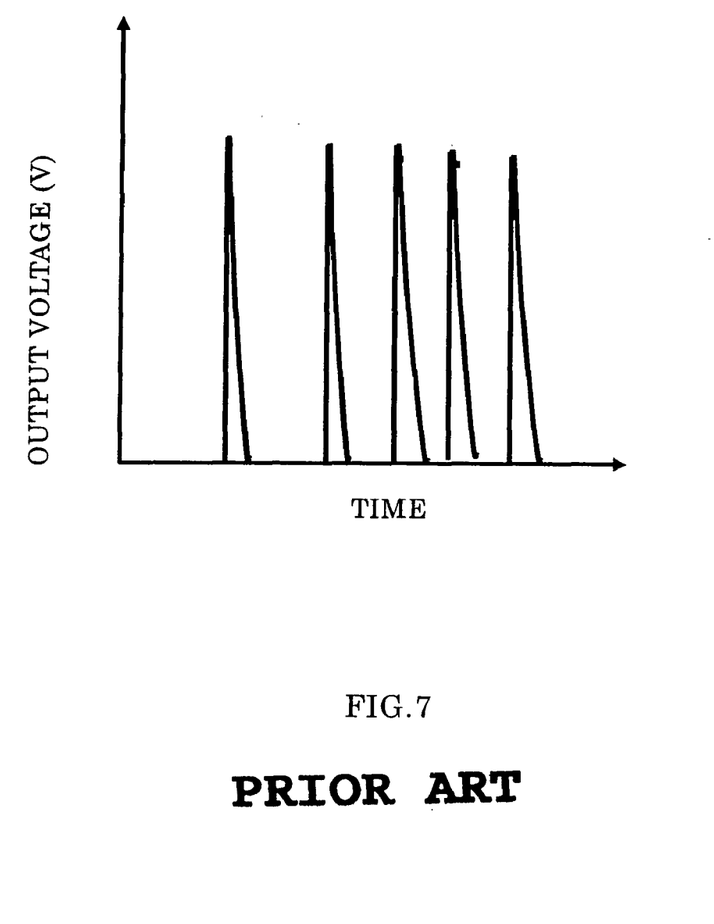
FIG. 7 is one example in which an output signal from a room temperature amplifier in regard to a time is measured by pulse-irradiating an X-ray whose energy value is already known to a micro-calorie meter.
Figure 8:
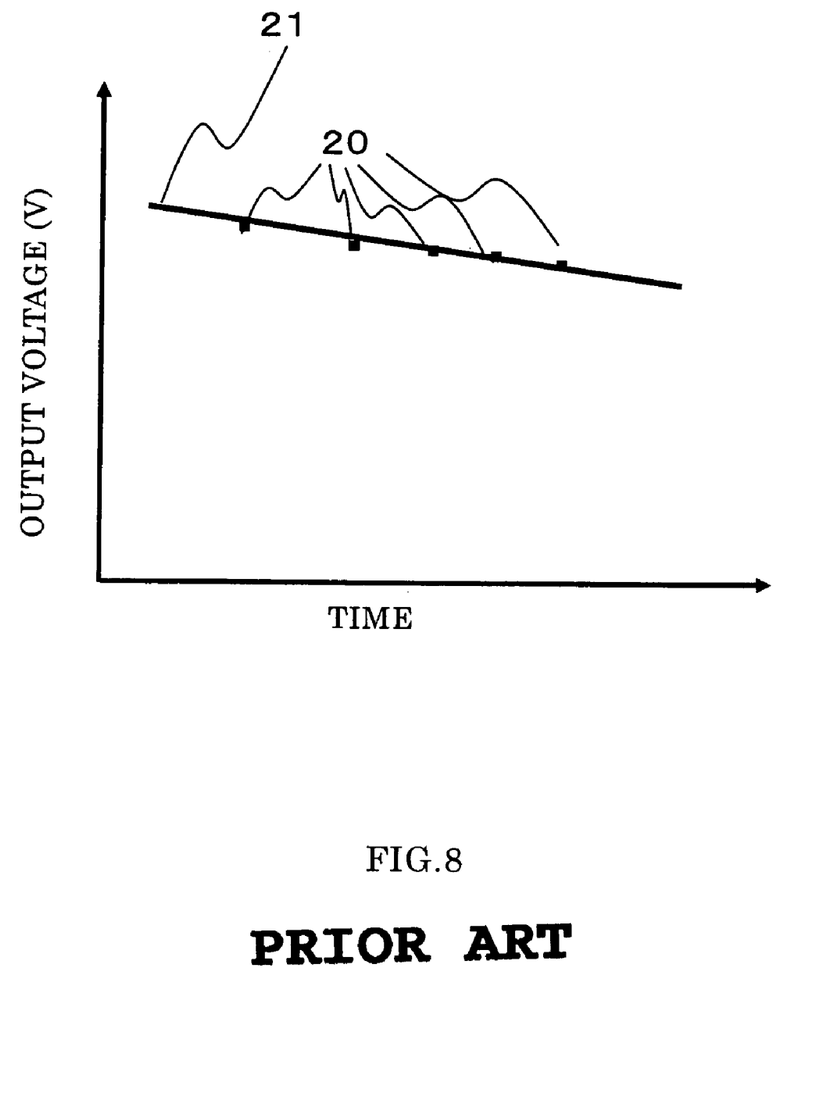
FIG. 8 is one example showing a correction function by plotting the output signal from the room temperature amplifier, which is measured for every one pulse in FIG. 7.

Whereupon, a conventional energy calibration method is explained by using FIG. 7 and FIG. 8.

(1) FIG. 7 is one example in which the output signal from the room temperature amplifier in regard to the time is measured by pulse-irradiating the X-ray whose energy value is already known to the micro-calorie meter.

(2) FIG. 8 is one in which there is plotted the output signal from the room temperature amplifier, which is measured for every one pulse in FIG. 7.

(3) A correction function in regard to the time is found by using a peak value 20 found from the plot of the output signal in FIG. 8. Here, a correction function 21 is found as a linear function.

Figure 9:
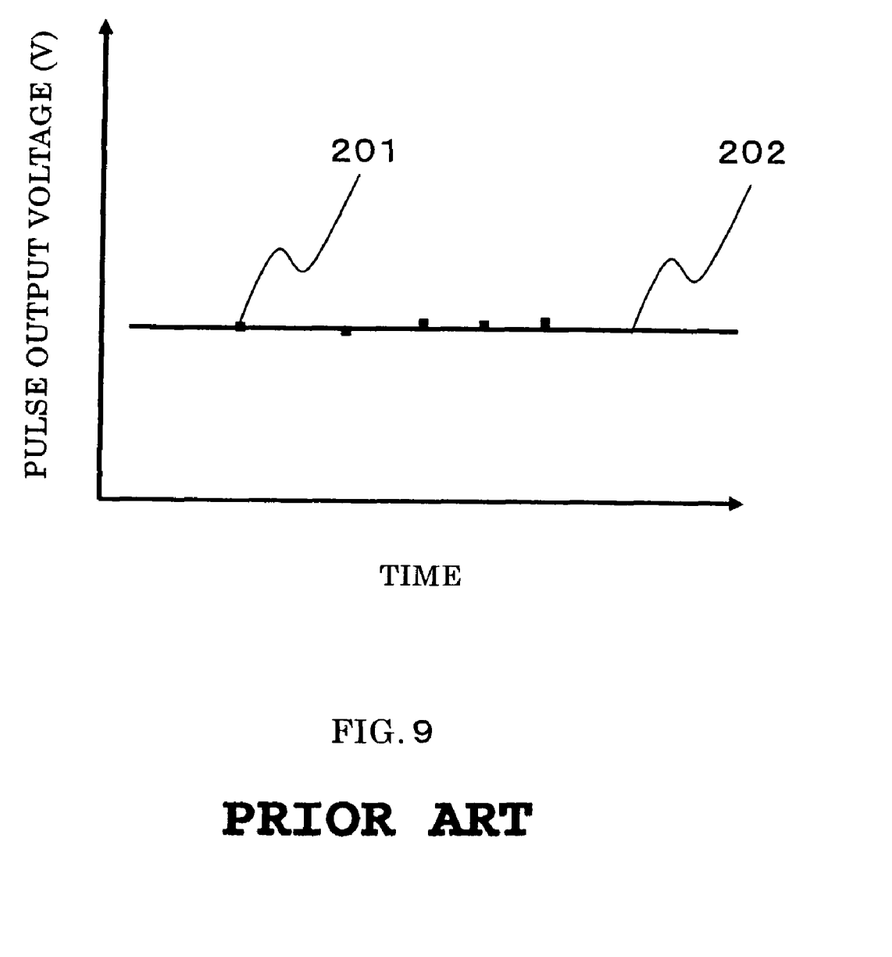
FIG. 9 is one example in which an energy calibration is performed by using the correction function such that a peak value of an output voltage from the room temperature amplifier becomes constant in regard to the time.

(4) FIG. 9 is one example in which the energy calibration is performed by using the correction function 21 such that the peak value of the output voltage from the room temperature amplifier becomes constant in regard to the time.

Figure 10:
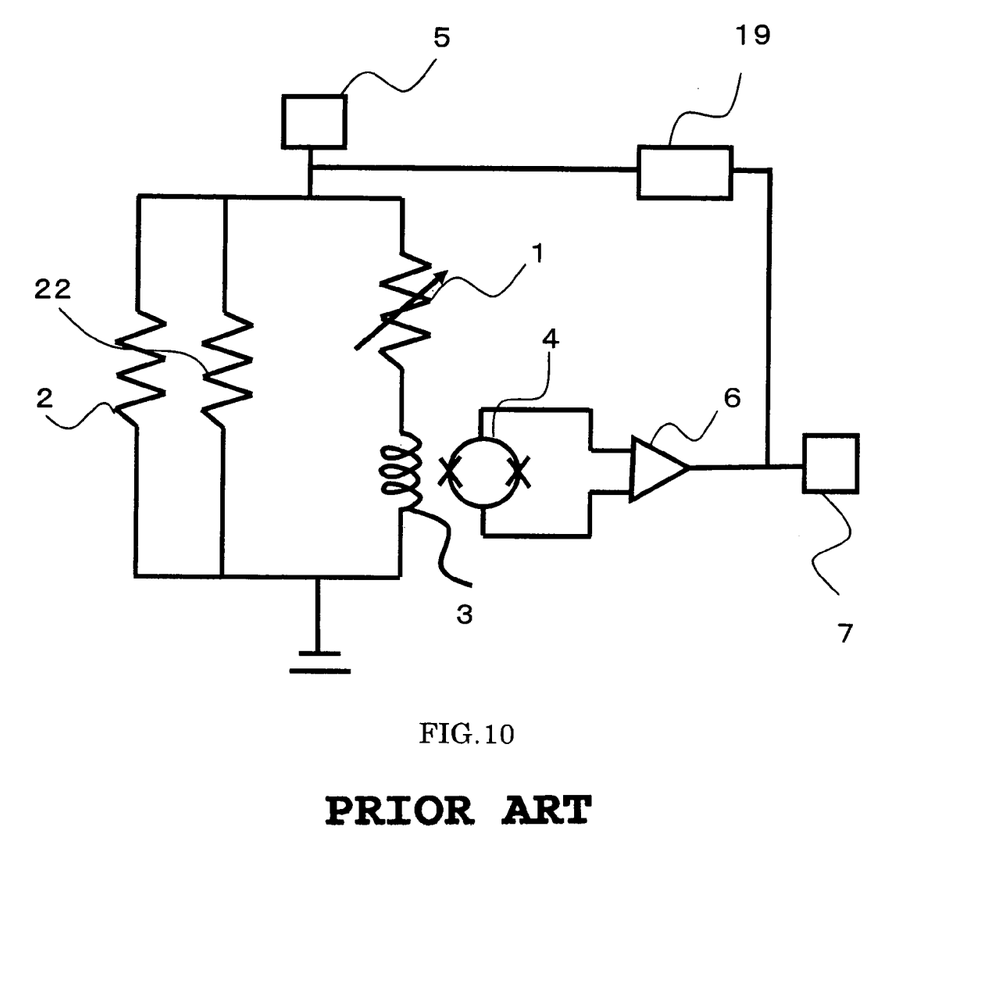
FIG. 10 is a schematic constitution diagram showing other conventional superconducting radiometry apparatus.

Further, FIG. 10 is a schematic constitution diagram of other superconducting radiometry apparatus using the micro-calorie meter.

In regard to the superconducting radiometry apparatus in FIG. 6, which was explained before, a resistor 22 is additionally provided in parallel to the micro-calorie meter 1, and a feedback circuit 19 connected to the room temperature amplifier 6 is connected. And, although a resistance of the micro-calorie meter rises by the fact that the temperature of the micro-calorie meter 1 rises by the entered X-ray, the temperature of the micro-calorie meter 1 is returned to the origin by applying the electric current or the voltage to the resistor 22 from the feedback circuit on the basis of the electric current corresponding to the output signal from the room temperature amplifier 6. In other words, by making such that the resistance of the micro-calorie meter 1 early returns to an original operating point, a response speed can be improved (e.g., refer to JP-A-2002-236052 Gazette).

However, in the superconducting radiation detection apparatus described above, the following problems are encountered.

In the above energy calibration method, since the correction function is found and the correction of the peak value of the output signal is performed after the peak values of all output voltages are obtained by pulse-irradiating the X-ray, there is an issue that a processing time till the correction function is obtained becomes long. Further, there is also the fact that the radiation heat and the magnetic field from the outside, which become a cause of a fluctuation of the peak value of the output signal from the room temperature amplifier, fluctuate every moment, so that it is impossible to accurately perform the correction by a correction method in an off-line.

Alternatively, in the superconducting radiation detection apparatus in which there is provided the feedback circuit in order to return the resistance of the micro-calorie meter to the original level, there remains such an issue that, similarly as described above, when thermal radiation occurs following upon the temperature change of the thermal shield plate for thermally protecting the micro-calorie meter from the outside, or the resistance change of the micro-calorie meter, which follows upon the change in the external magnetic field exerted on the micro-calorie meter, there occurs a shift of the detected X-ray energy with the peak value of the output signal from the room temperature amplifier being changed intact only by rapidly returning the resistance of the micro-calorie meter to the origin under a state including the resistance change by performing the feedback to the resistor by the feedback circuit.

SUMMARY OF THE INVENTION

The present invention is made in view of the foregoing drawbacks, its object is to provide a superconducting radiometry apparatus in which energy correction in regard to the fluctuation of the peak value of the output signal due to the radiation heat and the magnetic field from the outside is possible while sample-measuring.

In order to achieve the above object, this invention provides the following means.

A superconducting radiometry apparatus concerned with the present invention has a configuration including a micro-calorie meter detecting an energy of a radiant ray as a temperature change, a signal detection mechanism for detecting a displacement of an electric current flowing to the micro-calorie meter, a shunt resistance which is connected in parallel to the micro-calorie meter and whose resistance value is smaller than the micro-calorie meter, a bias electric source connected to the micro-calorie meter and the shunt resistance and applying a constant voltage, a heat addition device adding a constant and already-known heat quantity to the micro-calorie meter, a peak value monitor measuring a peak value corresponding to an added heat quantity within an output signal from the signal detection mechanism while synchronizing with a heat quantity addition from the heat addition device, and an energy correction device correcting, on the basis of an output from the peak value monitor, so as to become a peak value corresponding to the heat quantity from the heat addition device.

Further, in the superconducting radiometry apparatus concerned with the present invention, there is used the signal detection mechanism constituted by the input coil connected in series to the micro-calorie meter, the SQUID amplifier in which the superconducting quantum interference device (SQUID: Superconducting QUantum Interference Device) detecting the magnetic field occurring by the electric current flowing to the input coil and operating at the temperature below the liquid nitrogen temperature (absolute temperature 77 K) is plurally connected in series, and the room temperature amplifier shaping and amplifying the output signal from the SQUID amplifier.

Further, the superconducting radiometry apparatus concerned with the present invention possesses a wave height analyzer selecting and accumulating an output voltage from the signal detection mechanism while corresponding to the peak value for every energy, and a display device displaying a spectrum in the wave height analyzer.

Further, the heat addition device of the superconducting radiometry apparatus concerned with the present invention is made so as to use a radiation source irradiating the X-ray and a laser, which have a constant energy, electrons or ions, or a pulser electric source adding the electric current to the micro-calorie meter.

Additionally, the energy correction device of the superconducting radiometry apparatus concerned with the present invention is made so as to use a magnetic field application means, such as electromagnet and coil, applying the magnetic field to the micro-calorie meter, or a correction electric source adding the electric current to the micro-calorie meter.

According to the superconducting radiometry apparatus concerned with the present invention, since it becomes possible to perform, while sample-measuring, the energy calibration in regard to the fluctuation of the peak value of the output signal, which is due to the radiation heat and the magnetic field from the outside, a high resolving power measurement becomes possible.

DETAILED DESCRIPTION OF THE PREFERRED EMBODIMENT

Hereunder, an embodiment of the superconducting radiometry apparatus concerned with the present invention is explained by using the drawings.

Incidentally, this invention is not limited by this embodiment.

Embodiment 1

Figure 1:
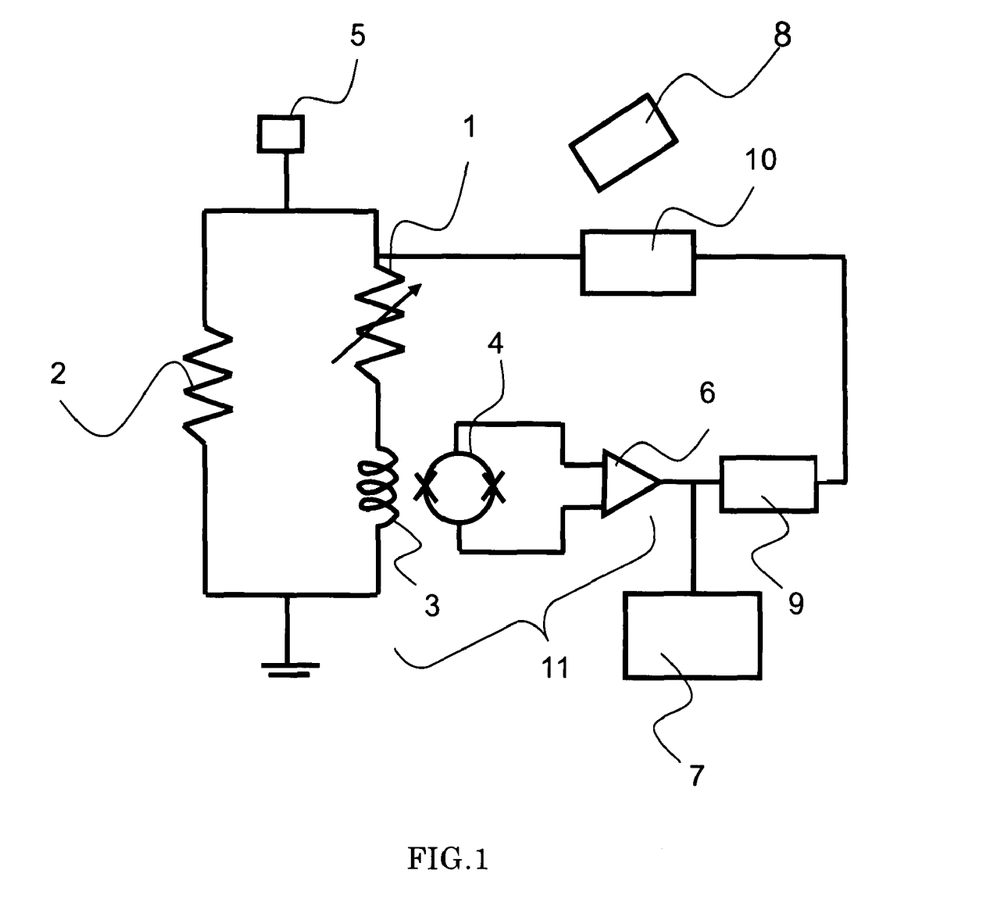
FIG. 1 is a schematic constitution diagram showing a superconducting radiometry apparatus concerned with an embodiment of the present invention.

FIG. 1 shows the schematic constitution diagram of the superconducting radiometry apparatus concerned with the present embodiment.

The micro-calorie meter 1 in the present embodiment is constituted by the absorber for absorbing the X-ray, which uses a metal body, a metalloid, a superconductor or the like, the thermometer comprising the super conductor whose resistance value changes by the heat generated by the absorber, and the membrane for controlling the heat flow rate with which the heat generated in the absorber and the thermometer escape to the heat tub. In the present embodiment, for the absorber constituting the micro-calorie meter 1 there is used aluminum (Al), for the thermometer a material comprising two layers of titanium and gold, and for the membrane and the heat tub silicon (Si).

The input coil 3 is connected in series to the micro-calorie meter 1, and the shunt resistance 2 whose resistance value is smaller than the micro-calorie meter 1 is connected in parallel to the micro-calorie meter 1 and the input coil 3. There is connected the bias electric source 5 applying the constant voltage to the micro-calorie meter 1, the input coil 3 and the shunt resistance 2. The electric current flowing to the micro-calorie meter 1 is detected as an electric signal by the SQUID amplifier 4, which is a low temperature first stage amplifier, through the input coil 3. There is connected the room temperature amplifier 6 for amplification-shape-controlling an output signal from the SQUID amplifier 4, and there is connected the wave height analyzer 7 selecting the output signal from the room temperature amplifier 6 while corresponding to the peak value of the voltage.

In the present embodiment, although the input coil 3, the SQUID amplifier 4, and the room temperature amplifier 6 have been described as forming the signal detection mechanism 11 (signal detecting means) for detecting the displacement of the electric current flowing to the micro-calorie meter 1, the signal detection mechanism is not limited to such construction, and any construction for the signal detection mechanism is suitable so long it is capable of detecting the displacement of the electric current flowing to the micro-calorie meter 1.

Additionally, the present embodiment possesses near the micro-calorie meter a heat addition device 8 (heat addition means) for adding, like a pulse, a constant heat quantity to the micro-calorie meter 1, and has a configuration including a peak value monitor 9 (measuring means) for measuring a peak value of an output voltage corresponding to the added heat quantity within an output signal from the room temperature amplifier 6 while synchronizing with the pulse-like heat quantity addition from the heat addition device 8, and an energy correction device 10 (correcting means) for correcting, on the basis of an output from the peak value monitor 9, an energy corresponding to the heat quantity from the heat addition device 8 so as to become the peak value.

The electric current flowing to the micro-calorie meter 1 is detected by the SQUID amplifier 4 through the input coil 3, and outputted while being amplified and shaped by the room temperature amplifier 6. If a constant heat quantity is applied like the pulse to the micro-calorie meter 1 from the heat addition device 8 adding the heat to the micro-calorie meter 1, an output voltage outputted while being amplified and shaped by the room temperature amplifier 6 is obtained like the pulse.

Figure 2:
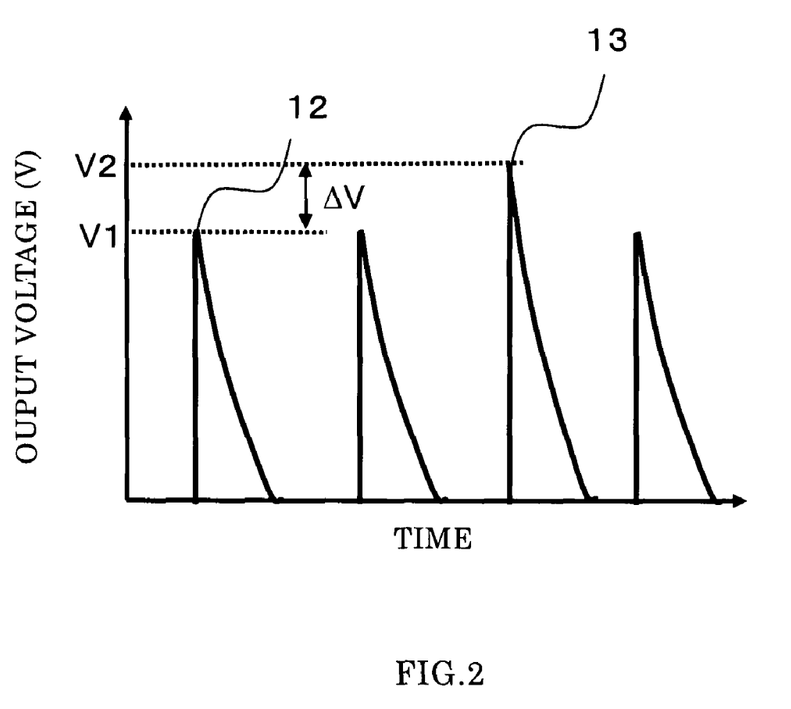
FIG. 2 is a schematic diagram showing a relation of a pulse output voltage in regard to a time, which is concerned with the embodiment of the present invention.

FIG. 2 is one example in which the output voltage from the room temperature amplifier 6 was measured by the peak value monitor 9 by pulse-irradiating the X-ray whose energy value was already known to the micro-calorie meter 1 from the heat addition device 8.

There are measured a peak value 12 coinciding with the X-ray of the already-known energy, which is irradiated with the peak value of the output voltage of a measurement data, and a peak value 13 in which the measurement data is changed in the output voltage due to influences of the magnetic field exerted on the micro-calorie meter 1 and the heat radiation from the heat shield surrounding the micro-calorie meter 1.

Figure 3:
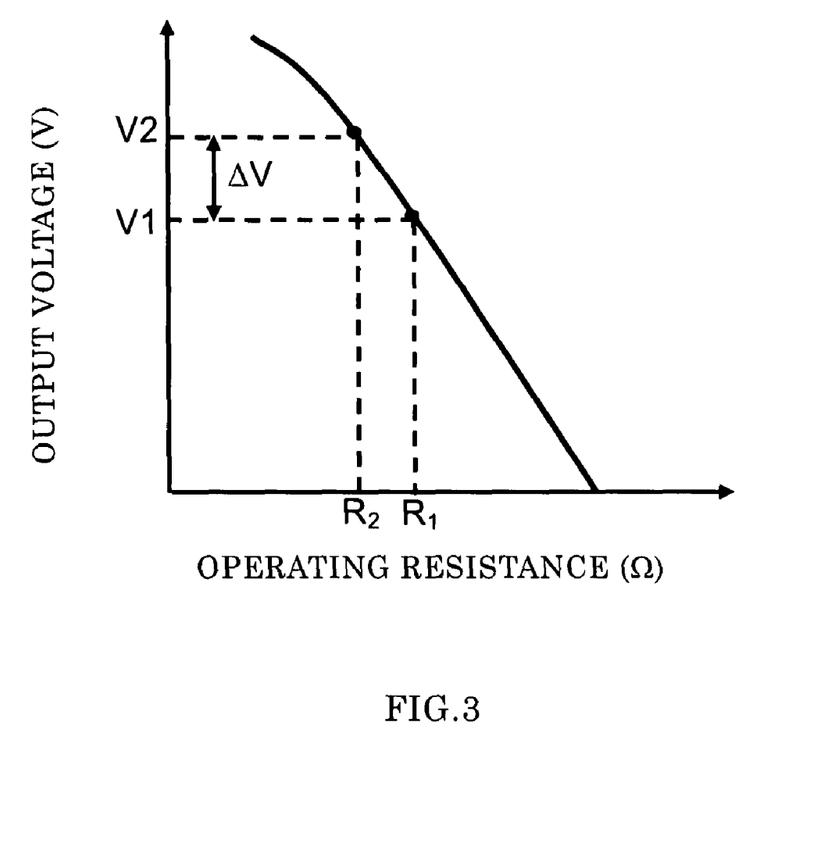
FIG. 3 is a schematic diagram showing a relation of the pulse output voltage in regard to an operating resistance, which is concerned with the embodiment of the present invention.

Here, a relation between a resistance value (operating resistance) of the thermometer of the micro-calorie meter 1 and the output voltage of the room temperature amplifier is shown in FIG. 3. Generally, there is a relation in which, if the operating resistance of the micro-calorie meter becomes small, the output voltage of the room temperature amplifier monotonously increases.

Here, it is supposed that, in FIG. 2, an output voltage when the first peak value 12 is obtained is V1, and an output voltage when the second peak value 13 is obtained is V2. It follows that, when a peak value fluctuation quantity of these output voltages is $\Delta V (=V2-V1)$, an operating resistance R1 of the micro-calorie meter fluctuates to an operating resistance R2.

Whereupon, the peak value fluctuation quantity from a measurement start time is detected by the peak value monitor 9 from a data of the peak value of the output voltage of the room temperature amplifier 6 so as to synchronize with the pulse irradiation to the micro-calorie meter 1 from the heat addition device 8, the peak value fluctuation quantity outputted from the peak value monitor 9 is sent to the energy correction device 10, and predetermined electric current and heat quantity are added to the micro-calorie meter 1 from the energy correction device 10 such that the peak value corresponding to the already-known energy from the heat addition device 8 nullifies the fluctuation. By this, it is possible to stabilize the operating resistance of the micro-calorie meter by performing the energy calibration by nullifying the fluctuation of the peak value of the output signal, which is due to the radiation heat and the magnetic field from the outside of the micro-calorie meter 1.

In the present embodiment, the X-ray is pulse-irradiated to the micro-calorie meter 1 from a sealed type X-ray source by using the sealed type X-ray source emitting only the X-ray of the already known energy as the heat addition device 8, the X-ray is irradiated to a sample from a separate sealed type X-ray source while making such that a resistance operation of the micro-calorie meter becomes constant by performing the energy calibration by using the energy correction device 10 such that the peak value becomes constant while selectively obtaining by the peak value monitor 9 a peak value data of the output voltage corresponding to an energy of the X-ray outputted from the room temperature amplifier 6, a fluorescent X-ray emitted from the sample is simultaneously detected by the micro-calorie meter 1, the peak value data of the output voltage outputted from the room temperature amplifier 6 is selected and accumulated while corresponding to the peak value for every energy by the wave height analyzer 7, and a spectrum obtained by being accumulated by the wave height analyzer 7 is displayed by the display device (not shown in the drawing).

Here, as the heat addition device 8, it is realized by applying a correction electric current to the micro-calorie meter 1 by using an addition electric source called a pulser electric source, which can apply a rectangular wave pulse sufficiently shorter than a pulse time constant of the micro-calorie meter 1.

Further, as the energy correction device 10, it is realized by using a correction electric source adding the electric current to the micro-calorie meter 1.

Figure 4:
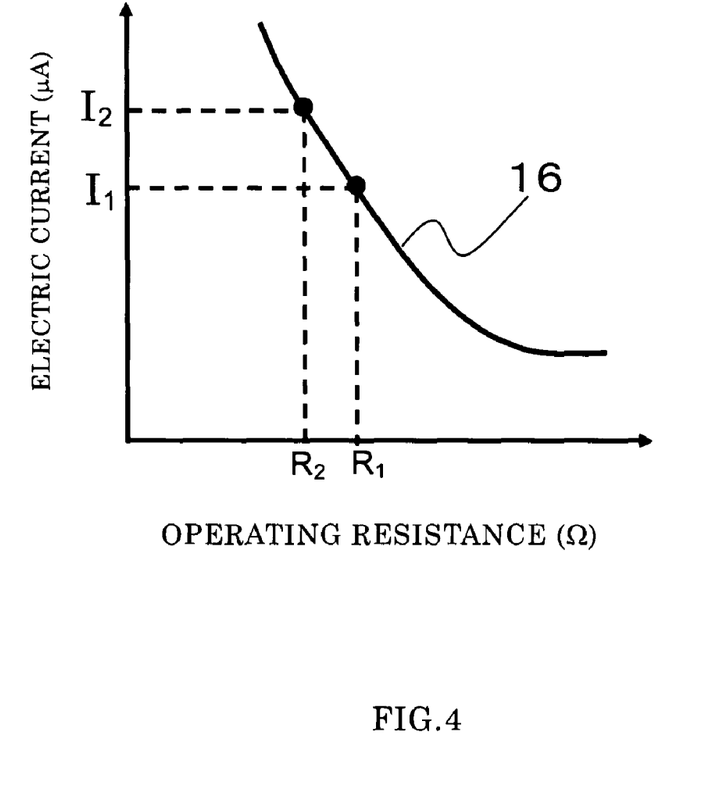
FIG. 4 is a schematic diagram showing a relation of a TES electric current in regard to the operating resistance, which is concerned with the embodiment of the present invention.

A relation between the correction electric current applied to the micro-calorie meter and the operating resistance of the micro-calorie meter is shown in FIG. 4. Between the electric current (It) and the operating resistance (Rt), there is a relation of an expression 2, and A is a constant.

$$It = \sqrt{A/Rt} \qquad \text{Expression 2}$$

It is supposed that the electric current flowing to the micro-calorie meter, which flows at a time of the operating resistance (R1), is I1, and the electric current flowing to the micro-calorie meter, which flows at a time of the operating resistance R2, is I2. In order to change the operating resistance (R2) to R1, there suffices if the electric current flowing to the micro-calorie meter is made small from I2 to I1.

Here, between an electric current (Ib) and an electric current (It) of the bias electric source 5 becoming a bias electric current source in FIG. 1, there is a relation of an expression 3.

$$I_b = [1 + R_t/R_s]I_t = [1 + R_t/R_s]\sqrt{A/Rt} \qquad \text{Expression 3}$$

Rs is a resistance value of the shunt resistance 2, and is always constant. From the expression 3, it is understood that, in order to change the operating resistance Rt, there suffices if Ib is changed. Normally, in a case where the operating resistance is made small, there suffices if the bias electric current is made small. As a result, even if the resistance of the micro-calorie meter 1 changes, also a value of the output voltage becomes always constant by changing the electric current flowing to the micro-calorie meter 1 (by changing the bias electric current).

Figure 5:
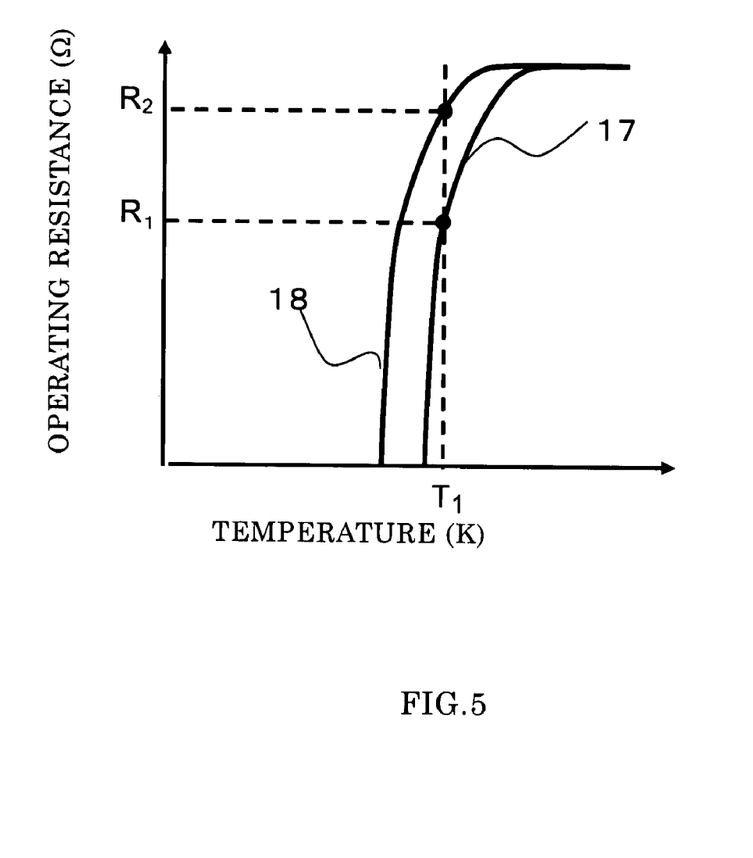
FIG. 5 is a schematic diagram showing a relation of the operating resistance in regard to a temperature due to a difference in a magnetic field intensity, which is concerned with the embodiment of the present invention.

Further, a characteristic (R-T characteristic) relating to the operating resistance and the temperature of the micro-calorie meter is shown in FIG. 5.

In the micro-calorie meter using the superconductor material, there changes a superconducting transformation temperature which is a temperature transforming to a superconducting state in compliance with a magnetic field intensity added to the micro-calorie meter. For example, if it is supposed that the R-T characteristic at a time of a certain magnetic field intensity is 17, and the R-T characteristic in a case larger than the above magnetic field intensity is 18, the R-T characteristic shifts to a low temperature side by the fact that the magnetic field increases.

The temperature of the micro-calorie meter 1 cooled below a liquid helium temperature (absolute temperature 4 K) by a dilution refrigerator or the like is always fixed to T1 and, as to the correction in a case where the operating resistance shifts due to the influence of the environmental magnetic field from the original operating resistance R1 to R2, there is shifted from the R-T characteristic 18 to the R-T characteristic 17 by reducing the magnetic field exerted on the micro-calorie meter 1 by a magnetic field application means. As a result, in a case where the magnetic field environment in the outside changes, the operating resistance of the micro-calorie meter 1 does not change by adjusting the magnetic field exerted on the micro-calorie meter 1, so that a value of the pulse output voltage becomes always constant as well.

Whereupon, as the energy correction device 10, by the fact that the magnetic field is generated by disposing a coil attached to an outer periphery of the micro-calorie meter 1 and applying the electric current to this coil, or by the fact that the magnetic field is generated by disposing an electromagnet or the like near the micro-calorie meter, there is nullified a change in the peak value of the micro-calorie meter 1, which follows upon an outside environmental change.

Incidentally, as the heat addition device 8 for adding the constant heat quantity to the micro-calorie meter 1, there may be used a radiation source generating a photon such as laser light, the X-ray having a constant energy, or an electron radiation source and an ion source, which are used in an electron microscope, an ion microscope and the like.

Incidentally, it is desirable that the output voltage measured by the peak value monitor 9 due to the heat addition device 8 selects the already-known energy used in the heat addition device 8 so as to differ from the output voltage generated by the X-ray emitted from the sample to be analyzed.

What is claimed is:

1. A superconducting radiometry apparatus comprising:
a micro-calorie meter that detects an energy of a radiant ray as a temperature change;
a shunt resistance connected in parallel to the micro-calorie meter and having a resistance value smaller than that of the micro-calorie meter;
a signal detection mechanism that detects an electric current flowing to the micro-calorie meter;
a bias electric source that applies a constant voltage to the micro-calorie meter;
a heat addition device that adds a quantity of heat to the micro-calorie meter;
a peak value monitor that measures, in synchronization with the addition of the quantity of heat to the micro-calorie meter by the heat addition device, a peak value of an output voltage corresponding to an output signal from the signal detection mechanism; and an energy correction device that corrects, on the basis of an output from the peak value monitor, an energy value so as to become a peak value corresponding to the quantity of heat added to the micro-calorie meter by the heat addition device.

2. A superconducting radiometry apparatus according to claim 1; wherein the heat addition device comprises a radiation source that irradiates an X-ray or a laser light having a constant energy level.

3. A superconducting radiometry apparatus according to claim 1; wherein the heat addition device comprises an electric source that supplies the electric current flowing to the micro-calorie meter.

4. A superconducting radiometry apparatus according to claim 1: wherein the energy correction device comprises a magnetic field application device that applies a magnetic field to the micro-calorie meter.

5. A superconducting radiometry apparatus according to claim 1; wherein the energy correction device comprises a correction electric source that supplies the electric current to the micro-calorie meter.

6. A superconducting radiometry apparatus according to claim 1; wherein the heat addition device comprises a pulse heat addition device that adds the quantity of heat to the micro-calorie meter as pulses of heat.

7. A superconducting radiometry apparatus according to claim 1; wherein the signal detection mechanism detects a displacement of the electric current flowing to the micro-calorie meter.

8. A superconducting radiometry apparatus according to claim 1; wherein the heat addition device comprises a radiation source that pulse-irradiates an X-ray to the micro-calorie meter.

9. A superconducting radiometry apparatus according to claim 1; wherein the heat addition device comprises an pulsating electric source that applies rectangular wave electric pulses to the micro-calorie meter.

10. A superconducting radiometry apparatus according to claim 1; wherein the heat addition device comprises a radiation source that applies laser light to the micro-calorie meter.

11. A superconducting radiometry apparatus according to claim 1; wherein the signal detection mechanism comprises an input coil, a low-temperature first-stage amplifier that detects the current flowing through the micro-calorie meter as an electric signal through the input coil, and a room-temperature amplifier that controls an output signal from the low-temperature first-stage amplifier.

12. A superconducting radiometry apparatus according to claim 11; wherein the input coil is connected in series with the micro-calorie meter and in parallel with the shunt resistance.

13. A superconducting radiometry apparatus comprising:

micro-calorie meter that detects a temperature change of a radiant ray of heat;

detecting means for detecting an electric current flowing to the micro-calorie meter;

heat addition means for adding a preselected constant quantity of heat to the micro-calorie meter;

measuring means for measuring, in synchronization with the preselected constant quantity of heat added by the heat addition means, a peak value of an output voltage corresponding to an output signal from the detecting means; and correcting means for correcting, on the basis of an output from the measuring means, an energy value so as to become a peak value corresponding to the quantity of heat added to the micro-calorie meter by the heat addition means.

14. A superconducting radiometry apparatus according to claim 13; wherein the heat addition means comprises a radiation source that irradiates to the micro-calorie meter X-rays or a laser light having a constant energy level.

15. A superconducting radiometry apparatus according to claim 13; wherein the heat addition means comprises an electric source that supplies the electric current flowing to the micro-calorie meter.

16. A superconducting radiometry apparatus according to claim 13; wherein the correcting means comprises magnetic field application means for applying a magnetic field to the micro-calorie meter.

17. A superconducting radiometry apparatus according to claim 13; wherein the correcting means comprises an electric source that supplies the electric current flowing to the micro-calorie meter.

18. A superconducting radiometry apparatus according to claim 13; wherein the detecting means comprises an input coil, a low-temperature first-stage amplifier that detects the current flowing through the micro-calorie meter as an electric signal through the input coil, and a room-temperature amplifier that controls an output signal from the low-temperature first-stage amplifier.

19. A superconducting radiometry apparatus according to claim 13; wherein the heat addition means comprises a pulse heat addition device that adds the quantity of heat to the micro-calorie meter as pulses of heat.

20. A superconducting radiometry apparatus according to claim 13; wherein the heat addition means comprises a radiation source that pulse-irradiates X-rays to the micro-calorie meter.

* * * * *